W. W. WALLACE.
TRANSFER CAR.
APPLICATION FILED NOV. 6, 1918.
1,416,589.
Patented May 16, 1922.
2 SHEETS—SHEET 2.
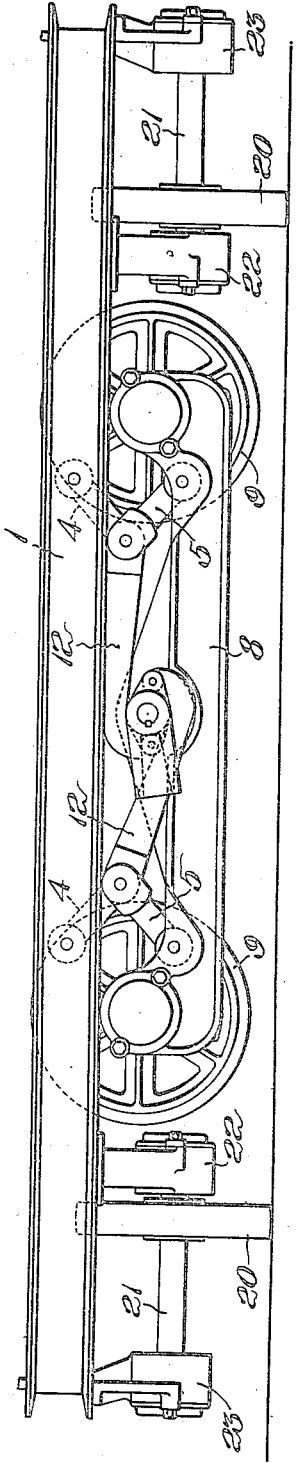
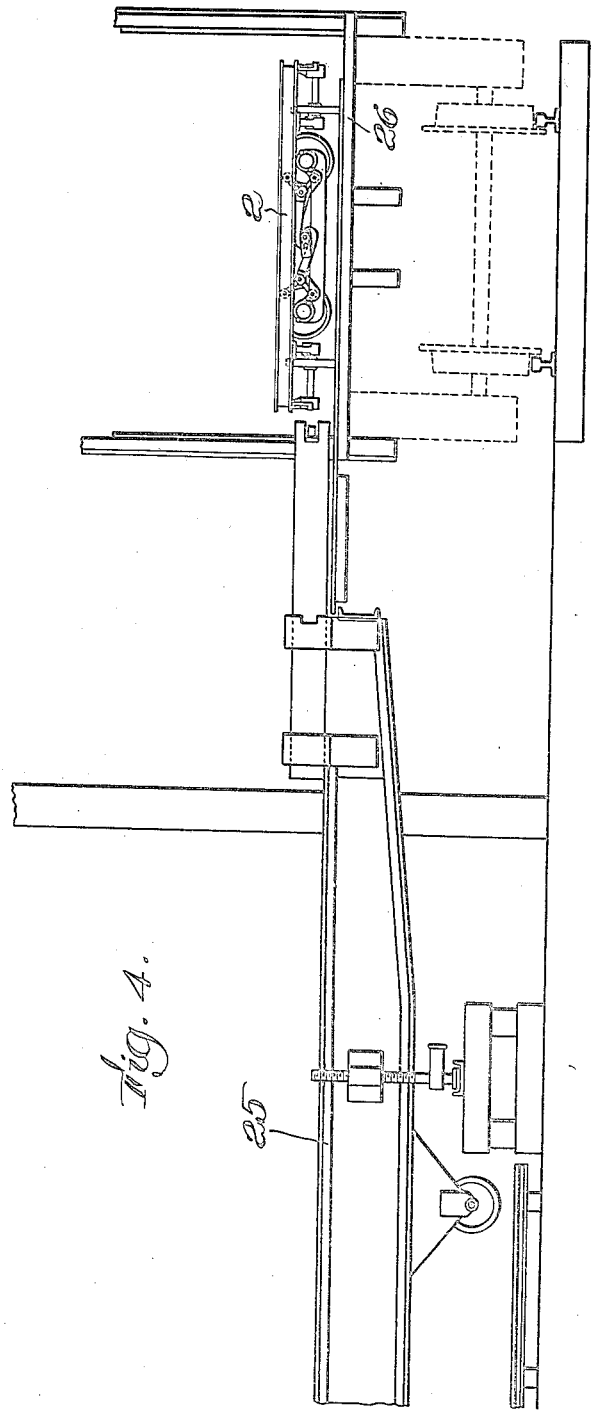
Inventor:
William W. Wallace,
by James K. Hodder.
Attorney.

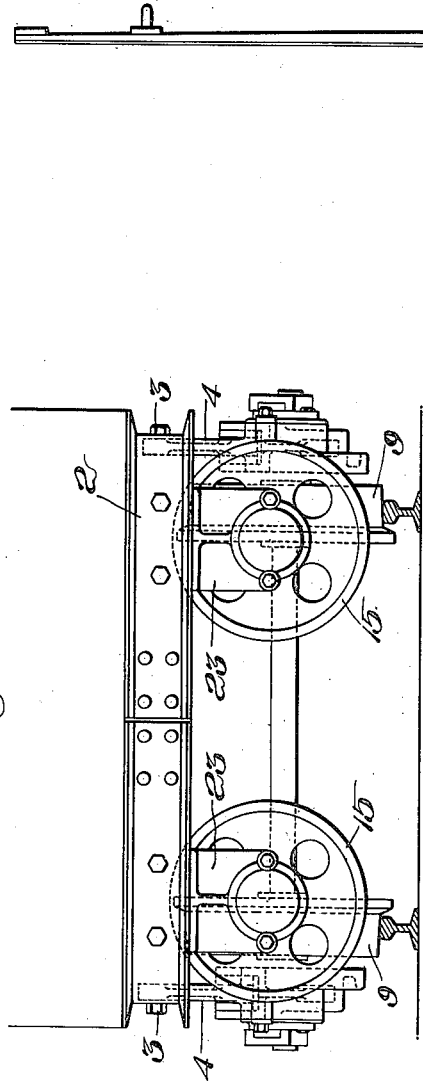
W. W. WALLACE.
TRANSFER CAR.
APPLICATION FILED NOV. 6, 1918.
1,416,589. Patented May 16, 1922.
2 SHEETS—SHEET 1.
Inventor:
William W. Wallace
by James R. Hodder
Attorney.

UNITED STATES PATENT OFFICE.

WILLIAM W. WALLACE, OF CHICAGO, ILLINOIS, ASSIGNOR TO RAYMOND C. PENFIELD, OF CHICAGO, ILLINOIS.

TRANSFER CAR.

1,416,589.    Specification of Letters Patent.    Patented May 16, 1922.

Application filed November 6, 1918. Serial No. 261,351.

*To all whom it may concern:*

Be it known that I, WILLIAM W. WALLACE, a citizen of the United States, and resident of Chicago, in the county of Cook and State of Illinois, have invented an Improvement in Transfer Cars, of which the following description, in connection with the accompanying drawings, is a specification, like letters on the drawings representing like parts.

My present invention is a novel form of transfer car having means adapted to enable this car to run in a plurality of directions, preferably at least in two directions at right angles to each other without swiveled trucks. The invention also contemplates the construction of a car having a plurality of wheels preferably so arranged that one set of wheels will enable the car to be run in one direction and another set will enable the car to be run in another direction, together with mechanism which will bring a predetermined set of wheels into use, eliminating the use of the other set of wheels. In many fields of work, also, it is customary to utilize separate transfer cars of large capacity with a series of pairs of tracks transversely thereto on which small cars may be run, the transfer car then conveying these small cars at right angles to their original trackage to a new position, where the small cars are run off onto other tracks. Such transfer cars are used to a large extent in brick yards, in car shops, in car barns and other places. My present invention applies particularly to a transfer car for use in brick yards where the car will be, for example, loaded with green brick, run into a drier, pushed through the drier and then transferred in a direction at right angles to the drier tracks, to a kiln for unloading during kiln building and for a similar operation in removing burned brick from the kiln to a boat, freight car or other transporting conveyance. As herein shown in a preferred form, I have illustrated the transfer car of a type suitable for use in a brick yard and adapted to transport a load of brick on tracks running into a freight car, whereupon the wheels used to run the truck into the freight car are thrown out of operation and a different set of wheels adapted to move at right angles toward each end of the freight car are brought into use to facilitate unloading the brick. This particular problem—of loading a freight car by means of such trucks—is of special importance because within the narrow confines of such freight car it would be impossible to turn the truckload of brick and move it toward an end of the car, and if not thus moved, the manual operation of removing the brick from the truck and stacking it in the freight car is slow, cumbersome and expensive.

As herein illustrated, I prefer to build the transfer car or truck with a set of four flanged wheels adapted to run on tracks lengthwise of the truck, and to apply to the car a set of four unflanged wheels adapted to move the truck at right angles or widthwise to the length, said widthwise sets of wheels being normally out of operation but capable of being instantly brought into use by mechanism adapted to raise or lower the flanged wheels. It will be understood that such raising or lowering mechanism may be applied to either set of wheels, but in the preferred embodiment shown, it is much easier to lower a loaded truck from the flanged wheels onto the unflanged sets of wheels. Then, when the load has been removed, to bring the flanged wheels back into place by mechanism adapted to lower the same and consequently lift or elevate the car, removing the unflanged wheels from contact with the surface.

Other details of the inventions, combinations of parts and advantages will be hereinafter more fully pointed out and claimed.

Referring to the drawings illustrating a preferred embodiment of the invention,

Fig. 1 is an end view of the truck or car of my invention;

Fig. 2 is a side view showing the flanged wheels in lowered and operative position;

Fig. 3 is a side view showing the flanged wheels in raised or inoperative position and the other set of wheels for crosswise movement of the car, in operative position; and Fig. 4 is a diagrammatic view illustrating the facility with which the car operates in loading freight cars for transportation of brick or other articles.

As shown in Figs. 1 and 2 I provide a car or truck of any suitable design or type, that therein shown being expressly adapted for use in handling brick in stacked units by mechanical setters. The truck consists in the usual side frames 1 and end frames 2, preferably of T bars. To the side frames 1 are pivoted at 3, 3, the arms 4, 4 of a toggle joint, the lower arms 5, 5, being pivoted to the first arms at 6, 6, and being also pivotally joined at 7, 7, with the truck frame 8. The latter carries journal bearings for the flanged wheels 9, 9, said wheels being adapted to run on a track 10, as shown. If desired, a ball bearing journal may be utilized, as indicated in dotted lines at 11, 11. Secured to the toggle arms 4 and 5 at their pivots 6 are bars 12, extending toward each other and being pivotally joined at 13, 13, to a member 14, having its hub 15 journaled on the stud 16, secured to a plate 17 on the truck frame 8. To the hub also is secured a socketed member 18 adapted to receive a lever to rotate the member 14 on the stud 16 and by moving the arms 12, 12, to break or strain the sets of toggle arms 4 and 5. As illustrated in Fig. 3, the toggle arms are broken, moving the frame 8 and wheels 9, 9, upwardly, raising the wheels from the track and consequently allowing the car to be lowered until the right-angled sets of wheels 20, 20, are in contact with the ground support or crosswise track, and the car resting thereon. These wheels are preferably unflanged and adapted to run on bars, each wheel being mounted on an axle 21 journaled in suitable bearings in hangers 22 and 23, four such wheels being shown. The car in this position is adapted to be moved transversely of the former line of movement. The fixed wheels 20 may be positioned sufficiently above the track 10 so that, when desired, a plank may be run under the wheels 20 crosswise of the tracks 10 before the flanged wheels are lifted, thus permitting the transfer car to be run off the tracks at any point desired.

As shown in Fig. 4 I have illustrated the transfer car after it is run off on its flanged tracks from the bridge 25 to the floor of a freight car diagrammatically shown at 26, the truck running off the track on the rim of the flanges and its wheels 9, then the toggle mechanism being operated to lower the car on the wheels 20, whereupon it may be run to either end of the freight car 26 to facilitate unloading the brick carried thereby. In the particular type of car illustrated in Fig. 2, a plurality of supports 30 are arranged to enable a stacked unit of brick to be lowered onto the car, but this, as will be readily understood, is for convenience in handling any stacked units where a mechanical setting apparatus is used, and is a special feature of the transfer car here shown but the lifting mechanism may be applied to other kinds of cars.

In order to relieve the toggle 4 and 5 from excessive strain, I find it convenient to apply guides or struts 19, 19, from the car frame and the journal bearings on the truck frame 8. This arrangement steadies the journals, holds the wheels and frame in proper alinement, and strengthens the same, while permitting these sets of wheels to be raised or lowered.

In the particular form of car herein illustrated, adapted for use with a mechanical setting device whereby an entire unit or stack of brick, usually from 800 to 1200 in unit stack formation,—could be lowered upon the car. In some of these mechanical lifting or setting devices, a plurality of lifting bars or fingers are arranged to slide under the brick stack and to be withdrawn from the stack after the latter is set down upon a support. For this purpose, I provide a plurality of spaced supports 30 permitting the lifting bars of a mechanical setter to rest between said supports while depositing the unit stack of brick upon such a car for unloading or for permitting a mechanical setter to be applied to a load of brick on such a car to lift the same therefrom.

My invention is further described and defined in the form of a claim as follows:

A brick carrying car of the kind described, having a plurality of sets of wheels arranged angularly with relation to each other, means to bring a predetermined set of said wheels into operative position to support the car; and a plurality of spaced supports on the car deck to cooperate with mechanical setting devices for loading and unloading a unit stack of brick on the car.

In testimony whereof, I have signed my name to this specification, in the presence of two subscribing witnesses.

WILLIAM W. WALLACE.

Witnesses:
  A. B. BRADSTOCK,
  I. L. CRALL.